US00RE37544E

(19) United States
(12) Reissued Patent
Darlington

(10) Patent Number: US RE37,544 E
(45) Date of Reissued Patent: Feb. 12, 2002

(54) SINGLE-CAM COMPOUND ARCHERY BOW

(76) Inventor: Rex F. Darlington, 3540 Darton Rd., Hale, MI (US) 48739

(21) Appl. No.: 09/558,485

(22) Filed: Apr. 25, 2000

Related U.S. Patent Documents

Reissue of:
(64) Patent No.: 5,934,265
Issued: Aug. 10, 1999
Appl. No.: 08/853,260
Filed: May 9, 1997

U.S. Applications:

(63) Continuation-in-part of application No. 08/603,220, filed on Feb. 20, 1996, now abandoned
(60) Provisional application No. 60/017,486, filed on May 10, 1996.

(51) Int. Cl.[7] ..... F41B 5/10
(52) U.S. Cl. ..... 124/25.6; 124/900
(58) Field of Search ..... 124/25.6, 900

(56) References Cited

U.S. PATENT DOCUMENTS

| | | | | |
|---|---|---|---|---|
| 4,519,374 A | | 5/1985 | Miller | 124/25.6 |
| 4,774,927 A | | 10/1988 | Larson | 124/25.6 |
| 4,838,236 A | | 6/1989 | Kudlacek | 124/25.6 |
| 4,926,832 A | | 5/1990 | Darlington | 124/25.6 |
| 4,926,833 A | | 5/1990 | Darlington | 124/23.1 |
| 4,967,721 A | * | 11/1990 | Larson | 124/25.6 |
| 4,976,250 A | | 12/1990 | Jeffrey | 124/25 |
| 4,986,250 A | | 1/1991 | Darlington | 124/25.6 |
| 5,092,309 A | | 3/1992 | Beaton | 124/35.2 |
| 5,301,651 A | | 4/1994 | LaBorde et al. | 124/25.6 |
| 5,368,006 A | | 11/1994 | McPherson | 124/25.6 |
| 5,433,792 A | | 7/1995 | Darlington | 124/25.6 |
| 5,505,185 A | | 4/1996 | Miller | 124/25.6 |
| 5,649,522 A | | 7/1997 | Troncoso | 124/25.6 |
| 5,678,529 A | | 10/1997 | Larson | 124/25.6 |
| 5,975,067 A | | 11/1999 | Strother | 124/25.6 |

FOREIGN PATENT DOCUMENTS

CA 2183305 2/1997

OTHER PUBLICATIONS

Alpine Archery Bow Manual, 1989.

Mulloney, "One Step Beyond the Compound?" Arachery World, Sep. 1976.

(List continued on next page.)

*Primary Examiner*—John A. Ricci
(74) *Attorney, Agent, or Firm*—Reising Ethington Barnes Kisselle Learman & McCulloch

(57) ABSTRACT

A single-cam compound archery bow that includes a bow handle from which bow limbs project, a control wheel rotatably mounted on one end of one limb and a power [can] *cam* rotatably mounted at an opposing end of the other limb. A power cable segment is anchored at one end to the one limb and at a second end to the power [can] *cam* at a position to wrap into and unwrap from a power cable groove on the power cam. A bow string cable segment is anchored to the control wheel and to the power cam at positions to wrap into and unwrap from first and second bow string take-up grooves on the control wheel and power cam respectively. The bow string cable segment has a nock point disposed between the spaced limb ends. A control cable segment is anchored at one end to the control wheel at a position to wrap into and unwrap from a control groove on the control wheel, and is anchored at an opposing end to the power cam. As the bow string cable segment is drawn away from the handle, the bow string cable segment unwraps equally from the control wheel and power cam, wraps the power cable segment into the power cable groove on the power cam so as to draw the bow limb ends together up to a power let-off point at the power cable groove, and wraps the control cable segment into the control groove on the control wheel. Length of the power cable groove on the power cam, and position of the power let-off point on the power cam, are adjustable while maintaining a fixed separation between the power let-off point and the control cable anchor on the power cam, so that the nock point travels in a straight line as the bow string cable section is drawn and released independent of adjusted length of the power cable groove and position of the power let-off point.

70 Claims, 10 Drawing Sheets

OTHER PUBLICATIONS

"Graham Take–Down Dynabo," Archery World, Jun./Jul. 1980.

Patent Application of Larry D. Miller for "Archery Bow Assembly," date and serial number unknown.

"Instruction Manual—York Thunderbolt DynaBo," York Archery (date unknown).

"M–10 DynaBo Draw Chart," Martin Archery, Inc. (date unknown).

M–10 Cheetah DynaBo Owner's Manual, Martin Archery (date unknown).

* cited by examiner

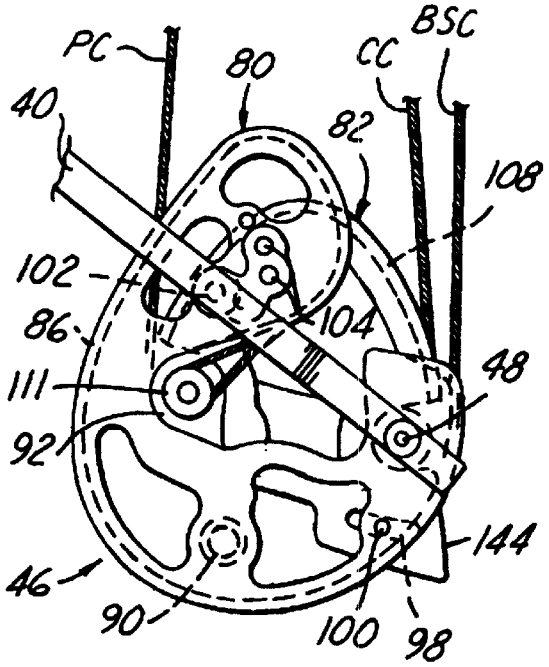
FIG. 7
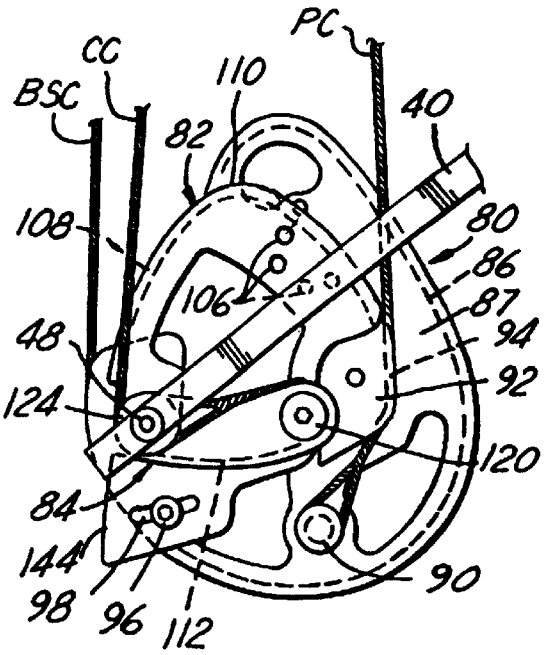
FIG. 8
FIG. 9
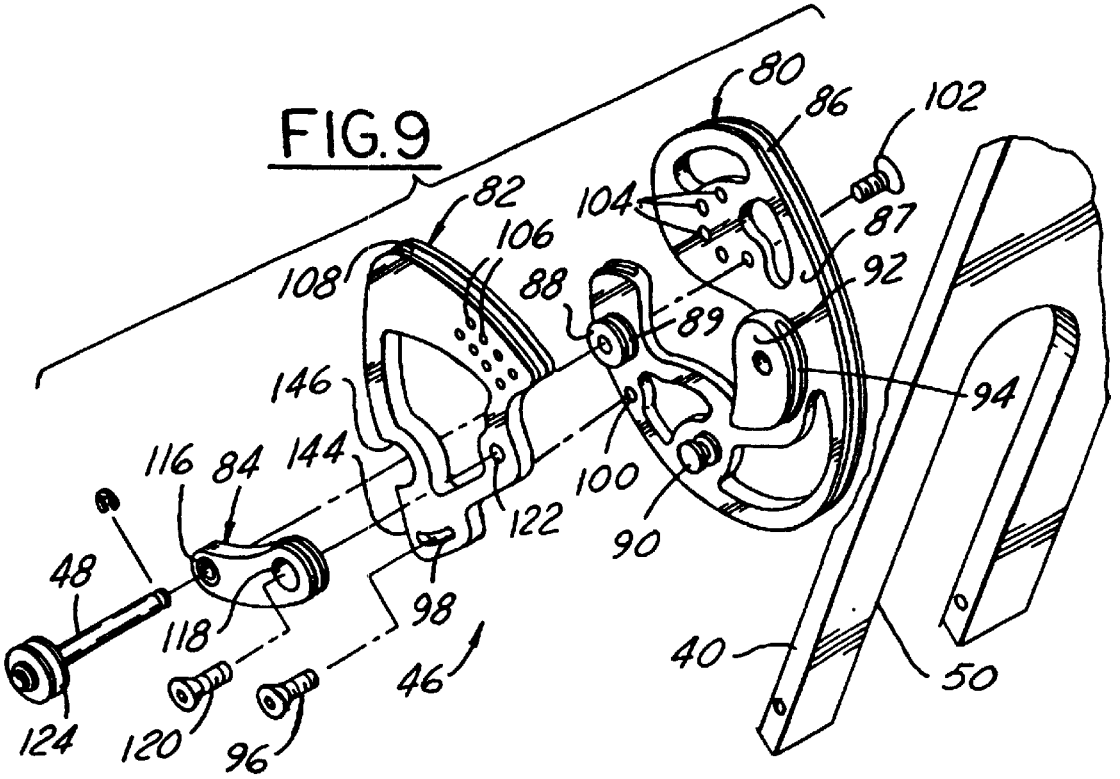

SINGLE-CAM COMPOUND ARCHERY BOW

Matter enclosed in heavy brackets [ ] appears in the original patent but forms no part of this reissue specification; matter printed in italics indicates the additions made by reissue.

This application is a continuation-in-part of application Ser. No. 08/603,220 filed Feb. 20, 1996 now abandoned. This application also claims priority from provisional application Ser. No. 60/017,486 filed May 10, 1996.

The present invention is directed to compound archery bows, and more particularly to a so-called single-cam compound archery bow having a power let-off cam mounted on the end of only one of the bow limbs.

BACKGROUND AND OBJECTS OF THE INVENTION

Compound archery bows typically are of the so-called dual-cam design, originated in U.S. Pat. No. 3,486,495. Bows of this type typically comprise a bow handle having limbs mounted on and extending from opposed ends of the handle. Power let-off cams are rotatably mounted on the free ends of the bow limbs and are interconnected by one or more cable sections including a draw string section. As the bow draw string is drawn away from the handle, draw force initially increases as the limbs are drawn together and the cams rotate to a power let-off point, and thereafter the leverage increases and the draw force decreases as the cams rotate further but with little additional limb flexure. This so-called compound action allows full bow draw to be maintained at lesser force without fatigue to the archer. A problem inherent in dual-cam bows of this type lies in the fact that the cams must be closely matched and synchronized with each other in order to insure straight-line (or substantially straight-line) travel of the nock point on the bow string, and the limbs must be closely balanced and evenly stressed as the string is drawn. Damage to or mismatching of the cams, mismatch or incorrect adjustment of the limbs, or stretching of the cable sections can cause loss of synchronization between the cams and uneven stressing of the limbs, resulting in less than optimum performance of the bow.

In order to overcome the aforementioned deficiencies of dual-cam bows, it has heretofore been proposed to provide a compound bow that has a single power let-off cam disposed at the end of one bow limb, and a control pulley or wheel disposed at the end of the opposing limb over which the bow string is trained. U.S. Pat. No. 5,505,185 discloses such a single-cam compound bow. A control cable cooperates with the power let-off cam and a control groove in the control wheel to maintain the desired relationship or timing between bow string take-up grooves in the control wheel and power cam. In this way, identical or substantially identical incremental bow string cable travel to and from the bow string take-up grooves is obtained, thereby yielding straight-line nock travel as the bow string cable is drawn and released. A power cable extends from the power cam to the opposing bow limb for flexing the bow limbs uniformly as the bow string is drawn, and for cooperating with the power cam to obtain the power let-off action that is characteristic of compound bows.

Although the single-cam compound bow disclosed in the noted copending application addresses and overcomes many problems theretofore extant in the art, further improvements remain desirable. In particular, the noted application does not disclose any means or technique for adjusting draw length of the bow. That is, the bow disclosed in the noted application obtains straight-line nock travel for a given bow draw length for which the power cam and the control wheel are designed. In order to change or adjust bow string draw length, the power cam and/or the control wheel must be changed to accommodate the new desired draw length while maintaining synchronous timing between the cam and wheel. In a commercial single-cam compound bow of a different design, accommodation is made for changing the bow string cable anchor point at the power let-off cam, and thereby changing the bow string draw length. However, since the cams and wheels are optimized for only a single draw length, changing the bow string anchor point inherently changes the path of nock travel as the bow is drawn and released, and consequently affects accuracy of the bow.

Another problem in single-cam compound bows heretofore proposed lies in the creation of a torque or twisting force on the bow limb that carries the power let-off cam, which varies as the bowstring is drawn and released. Bow limb torque is not a problem at the limb that carries the control wheel because the power cable segment can be anchored to the limb at both sides of the control wheel, and because the cable groove or grooves in the control wheel can be placed very close to the limb centerline. However, at the power cam, the bow string, power cable and control cable segments engage the cam at laterally spaced positions. These cable segments apply a torque through the cam axle to the bow limb. This problem is exacerbated when a cable guard is employed on the bow because the cable guard offsets the control and power cable segments from the bow limb centerline.

It is therefore a general object of the present invention to provide a compound bow that obtains the benefits of single-cam compound bow designs as compared with dual-cam designs—i.e., obtains uniform stressing of the bow limbs and straight-line (or substantially straight-line) nock travel—for a range of draw lengths. That is, an object of the present invention is to provide a single-cam compound bow in which the bow string draw length can be adjusted without deleteriously affecting other salutary operating characteristics of the bow. A more specific object of the present invention is to provide a single-cam compound bow of the described character in which bow string draw length can be adjusted by adjusting and/or replacing draw length modules on the bow power cam. A further and related object of the present invention is to provide a single-cam compound bow of the described character that obtains the foregoing objectives while employing standard cable lengths for economy of manufacture and service. Yet another object of the present invention is to provide a single-cam compound bow that has a positive bow string draw stop, which is deemed particularly desirable by archery enthusiasts, that automatically adjusts with draw length. A further object of the invention is to provide a single-cam compound bow in which torque applied to the power-cam limb, as the bow is drawn and released, is reduced or eliminated.

SUMMARY OF THE INVENTION

A single-cam compound archery bow in accordance with the present invention includes a bow handle with a pair of projecting limbs and a pair of cable pulleys rotatably mounted on the ends of the bow limbs. A bow cable includes a first cable segment anchored at one end to one of the bow limbs and at a second end to the opposing second pulley. Second and third cable segments are each anchored at one end to the second pulley and extend to the first pulley. The third cable segment has a nock point that, when drawn away from the handle, unwraps the third cable segment equally from the first and second pulleys, wraps the second cable segment onto the second pulley as the third cable segment is unwrapped therefrom, and wraps the first cable segment into a pulley groove in the first pulley so as to draw the limb ends together up to a power let-off point at the pulley groove. Length of the pulley groove, and consequently position of the power let-off point on the second pulley, is adjustable while maintaining a fixed spacing between the power let-off point and the anchor point of the second cable segment to the second pulley. In this way, the nock point travels in a straight line as the third cable segment is drawn away from the bow handle independent of length of the pulley groove between the power let-off point and the anchor of the first cable segment to the second pulley.

A single-cam compound archery bow in accordance with presently preferred embodiments of the invention includes a bow handle having spaced ends from which bow limbs project, a control wheel rotatably mounted on one end of one limb and a power cam rotatably mounted at an opposing end of the other limb. A power cable segment is anchored at one end to the one limb and at a second end to the power cam at a position to wrap into and unwrap from a power cable groove on the power cam. A bow string cable segment is anchored to the control wheel and to the power cam at positions to wrap into and unwrap from first and second bow string take-up grooves on the control wheel and power cam respectively. The bow string cable segment has a nock point disposed between the spaced limb ends. A control cable segment is anchored at one end to the control wheel at a position to wrap into and unwrap from a control groove on the control wheel, and is anchored at an opposing end to the power cam. As the bow string cable segment is drawn away from the handle, the bow string cable segment unwraps equally from the control wheel and the power cam, wraps the power cable segment into the power cable groove on the power cam so as to draw the bow limb ends together up to a power let-off point at the power cable groove, and wraps the control cable segment into the control groove on the control wheel. Length of the power cable groove on the power cam, and position of the power let-off point on the power cam, are adjustable while maintaining a fixed separation between the power let-off point and the control cable anchor on the power cam, so that the nock point travels in a straight line as the bow string cable segment is drawn and released independent of adjusted length of the power cable groove and position of the power let-off point.

In a single-cam compound archery bow in accordance with modified embodiments of the invention, the control wheel of the preferred embodiment is replaced by an idler pulley that has a single groove concentric with the axis of rotation. The control cable groove on the power cam is replaced by a second bowstring take-up groove. The bowstring is anchored at both ends to the power cam at positions to wrap into and unwrap from the first and second bowstring take-up grooves, and extends in a continuous run around the idler pulley. The continuous length of bowstring cable thus effectively forms a bowstring cable segment on what the nock is positioned, and a bowstring/control cable segment that is anchored to the power cam and controls play-out of the bowstring cable segment. Length of the power cable groove on the power cam, and position of the power let-off point on the power cam, are adjustable while maintaining a fixed separation between the power let-off point and the anchor point of the bowstring/control cable segment on the power cam. In this way, the nock point travels in a straight (or substantially straight) line as the bowstring cable segment is drawn and released independent of adjusted length of the power cable groove and position of the power let-off point.

In the preferred embodiments of the invention, the power cam comprises a cam base that includes the second bow string take-up groove, and a plurality of modules mountable on the base to provide power cable grooves of differing adjustable lengths. Each module is thus both selectively mountable/demountable on the cam base and adjustably positionable on the cam base for obtaining adjustable draw length over a wide draw length range. Each module has facility for affixing the anchor point of the control cable so as to maintain a fixed spacing between such anchor point and the associated power let-off point of each module. Thus, bow string draw length is adjustable over a wide range without in any way affecting other design capabilities of the bow, including particularly straight-line movement of the draw string nock point. In the preferred embodiment of the invention, the power cable segment, the control cable segment and the bow string cable segment are provided as separate lengths of cable stock, as distinguished from a continuous length of cable stock which is less preferred. In this way, the cable segments may be provided in standard lengths, which greatly facilitates economy of both manufacture and service. The bow power cam, specifically the adjustable/replaceable draw length module, includes a stop surface that circumferentially aligns with the power cable groove in the module, and which forms a positive stop against wrap of the power cable into the groove as the bow string is drawn. This feature of the invention provides a positive stop against bow string draw, which is particularly desired by archery enthusiasts. Furthermore, since the stop is provided on the adjustable module rather than the power cam base, stop position is automatically adjusted along with bow string draw length.

In accordance with another feature of the preferred embodiment of the invention, the control groove on the control [wheel, into] *arm of the cam from* which the control cable [wraps] *unwraps* as the bow string is drawn, is contoured to reduce twisting forces on the bow limb. Specifically, the control groove is contoured to reduce lateral separation between the control cable and the power cable as the power cable [and control cable are] *is* wrapped into the power cam *and the control cable is unwrapped* (i.e., as the bow string cable is withdrawn). This reduced lateral spacing reduces the force differential on the power cam that tends to twist the bow limb in which the power cam is mounted.

BRIEF DESCRIPTION OF THE DRAWINGS

The invention, together with additional objects, features and advantages thereof, will be best understood from the following description, the appended claims and the accompanying drawings in which:

FIG. 7 is a fragmentary elevational view on an enlarged scale of the portion of the bow in FIG. 1 within the circle 7. featuring the power cam in accordance with the presently preferred embodiment of the invention;

FIG. 8 is a fragmentary elevational view of the portion of the bow illustrated in FIG. 7 but viewed from the opposite side;

FIG. 9 is a fragmentary exploded perspective view of the power cam illustrated in FIGS. 7 and 8;

DETAILED DESCRIPTION OF PREFERRED EMBODIMENTS

Figure 1:
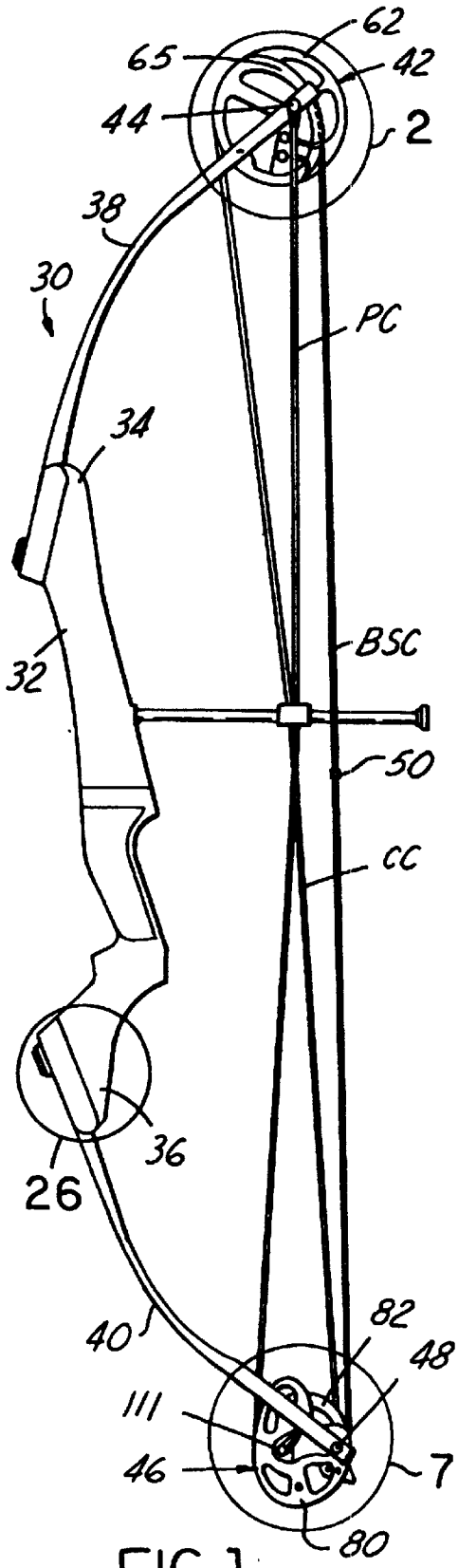
FIG. 1 is a side elevational view of a single-cam compound archery bow in accordance with one presently preferred embodiment of the invention.
Figure 2:
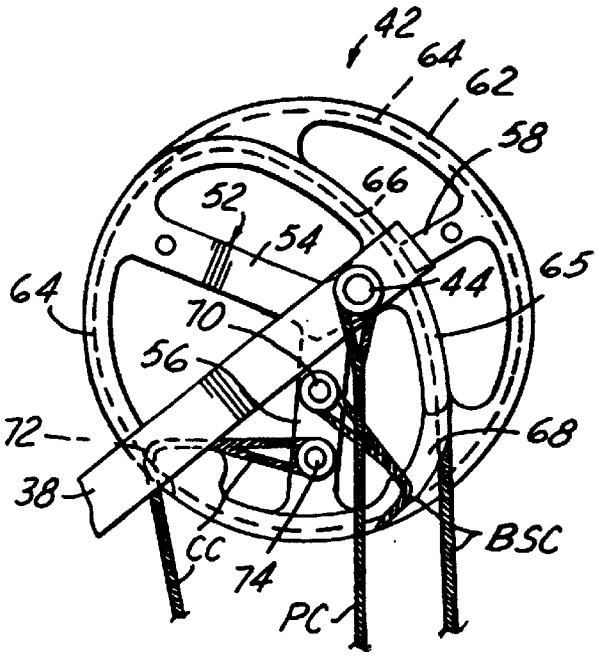
FIG. 2 is a fragmentary elevational view on an enlarged scale of the portion of FIG. 1 within the circle 1, featuring the control wheel in accordance with the presently preferred embodiment of the invention.
Figure 3:
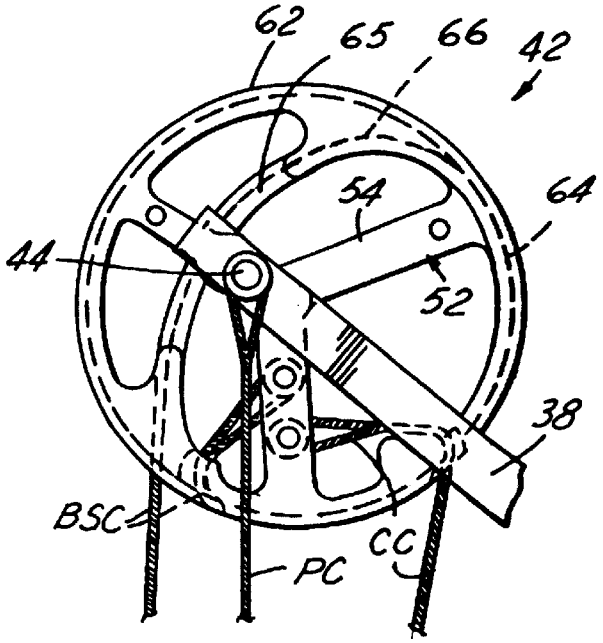
FIG. 3 is a fragmentary elevational view of that portion of the bow illustrated in FIG. 2 but viewed from the opposite side.
Figure 6:
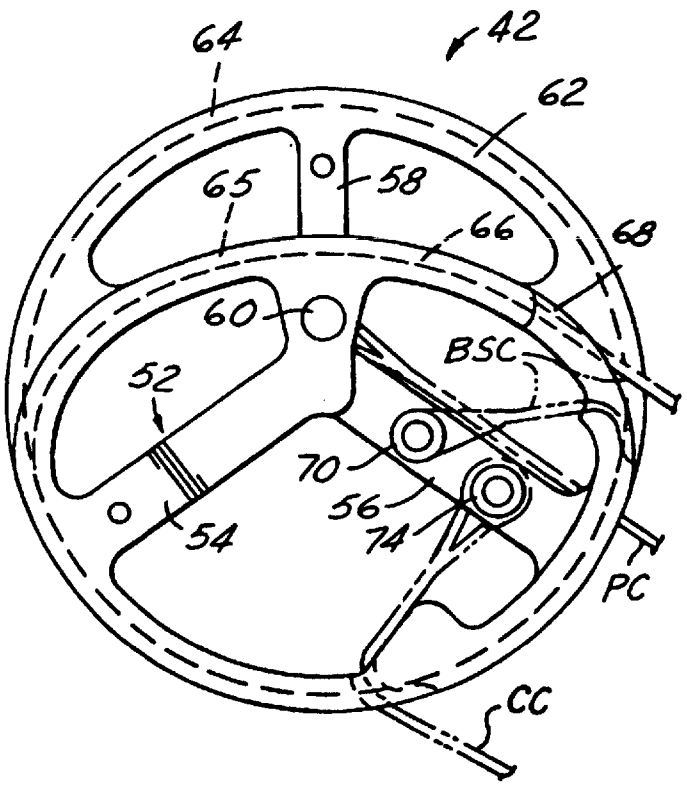
FIG. 6 is an elevational view of the control wheel illustrated in FIG. 4 but viewed from the opposite side.
Figure 5:
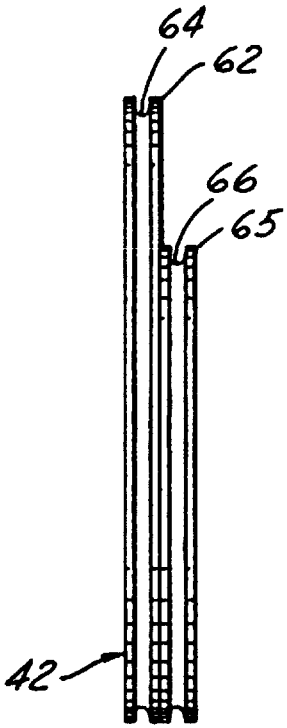
FIG. 5 is an end elevational view of the control wheel illustrated in FIG. 4.
Figure 4:
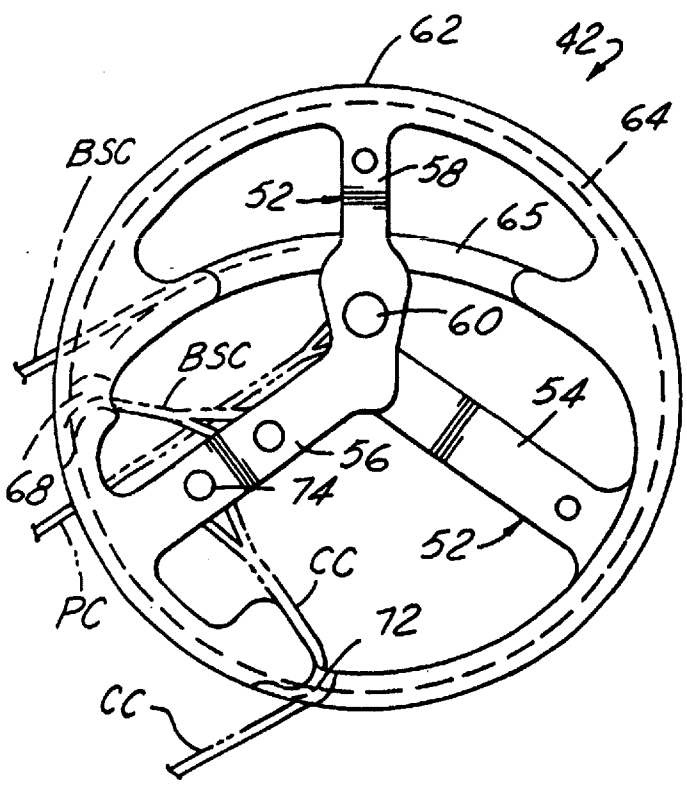
FIG. 4 is a side elevational view of the control wheel illustrated in FIGS. 1–3.
Figure 10:
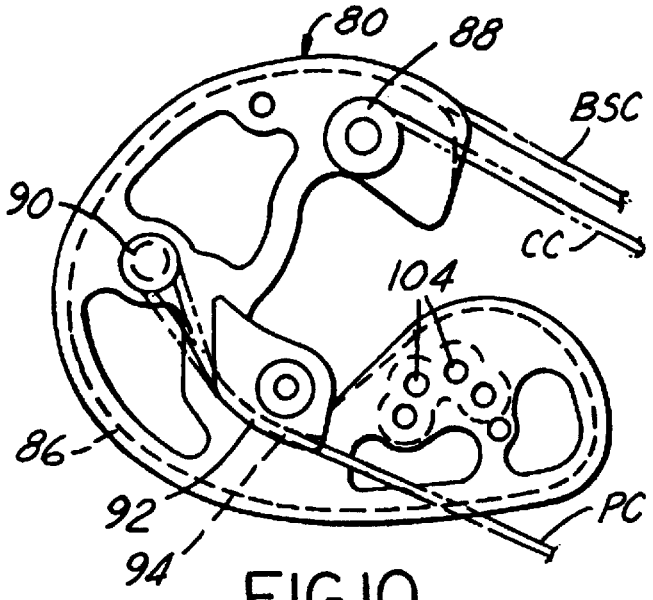
FIG. 10 is a side elevational view of the power cam base in the power cam of FIGS. 7–9.
Figure 11:
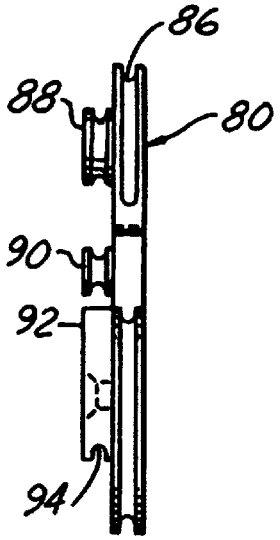
FIG. 11 is an end elevational view of the power cam base as illustrated in FIG. 10.
Figure 12:
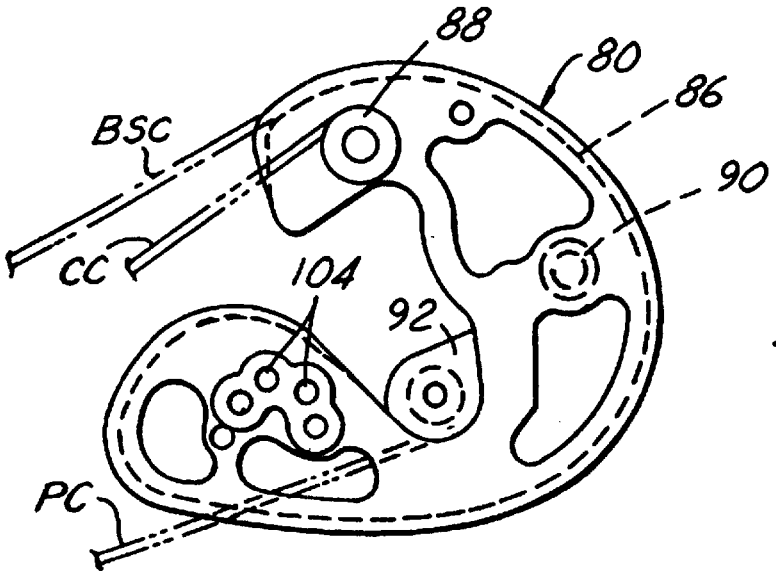
FIG. 12 is a side elevational view of the power cam base illustrated in FIG. 10 but viewed from the opposite side.

FIG. 1 illustrates a single-cam compound archery bow 30 in accordance with a presently preferred embodiment of the invention as comprising a handle 32 of cast magnesium or other rigid unitary construction having spaced ends 34, 36 with flat limb-mounting surfaces at each end. A pair of flexible limbs 38, 40 of fiber-reinforced resin or other suitable resilient construction are mounted on handle ends 34, 36 respectively, and project therefrom away from handle 32. A control wheel 42 is rotatably mounted on an axle 44 that extends laterally across the free end of bow limb 38, such that control wheel 42 is rotatably mounted within an open notch at the free end of limb 38. Likewise, a power cam 46 is rotatably mounted on an axle 48 that extends laterally across the free end of limb 40, such that power cam 46 is rotatably mounted within a notch 50 (FIG. 9) at the free end of limb 40. A power cable PC has a split end that is anchored to limb 38 at axle 44, preferably although not necessarily on both sides of control wheel 42 (FIGS. 1–3). Power cable PC extends across bow 30 to power cam 46, at which power cable PC is anchored. A control cable CC is anchored at one end to control wheel 42, and at an opposing end to power cam 46. Likewise, a bow string cable BSC is anchored at opposing ends to control wheel 42 and power cam 46. A nock 50 is carried by bow string cable BSC between control wheel 42 and power cam 46.

Referring in detail to FIGS. 2–6, control wheel 42 comprises a generally Y-shaped frame 52 having angularly spaced legs 54, 56 and 58. Axle 44 (FIG. 2) extends through a sleeve bearing in an opening 60 in leg 58 off-center with respect to frame 52. The outer ends of legs 54, 56, 58 are integrally joined to each other by a generally circular track 62, within which a radially outwardly facing peripherally control groove 64 is formed. That is, control or timing groove 64 is of generally circular geometry off-center with respect to axle 44 (FIG. 2) around which control wheel 42 rotates. A non-circular second track 65 extends around control wheel 42 laterally offset from track 62, within which a radially outwardly facing first bow string take-up groove 66 is formed. Track 65 interconnects the ends of frame legs 54, 56 concentrically with track 62, and interconnects the ends of legs 54, 56 to the midportion of leg 58 at greater substantially uniform radius of curvature. Bow string take-up groove 66 is thus of non-circular geometry in the embodiment of the invention illustrated in the drawings, and at lesser radius than control groove 64 through at least half of its length with respect to the structural center of control wheel 42. Both grooves 64, 66 are eccentric to the axis of axle opening 60. To the extent thus far described, control wheel 42 is preferably of one-piece monolithic construction. Bow string cable BSC is trained entirely around first bow string take-up groove 66 and through a radial opening 68 in track 66 to a bow string anchor 70 affixed to leg 56. (Bow string cable BSC, power cable PC and control cable CC are illustrated in phantom in FIGS. 4 and 6 for purposes of reference at their respective orientations at the relaxed condition of bow 30 in FIGS. 1–3.) Control cable CC is trained in the opposite direction around control groove 64, and thence through a radial opening 72 in track 62 to a second anchor 74 carried on leg 56. Power cable PC anchors to limb 38 at axle 44 on both sides of central wheel 42, as previously noted.

FIGS. 7–17 and 32 show power cam 46 (FIG. 1) in greater detail. Bow string cable BSC, control cable CC and power cable PC are again illustrated in phantom in FIGS. 10, 12 and 13 at the relaxed condition of bow 30 (FIG. 1) for purposes of reference. Power cam 46 is an assembly that includes a cam base 80, a draw-length module 82 and a control arm 84. Cam base 80 has a radially outwardly extending peripheral groove 86 that forms a second bow string take-up groove. Cam base 80 is of generally arcuate construction, on one flat face 87 of which is fastened or affixed an axle bushing 88, a power cable anchor 90 and a power cable guide 92. Axle bushing 88 has a peripheral cable-receiving groove 89 (FIG. 9). Power cable guide 92 has a radially outwardly facing arcuate groove 94 that forms part of the power cable groove on power cam 46, as will be described. Draw-length module 82 (FIGS. 8, 9 and 15) is removably and adjustably positioned on face 87 of cam base 80 by means of a screw 96 that extends through an arcuate slot 98 in module 82 into an internally threaded opening 100 in cam base 80, and a screw 102 (FIGS. 7 and 9) that extends through a selected one of a plurality of openings 104 in cam base 86 into a selected one of a plurality of angularly and radially spaced internally threaded openings 106 in module 82. Openings 106 in module 82 are formed in two arrays at respective uniform radial spacing from bushing 88. Likewise, openings 104 in cam base 80 are formed in two angularly and radially spaced arrays at uniform spacing from bushing 88. Slot 98 is also concentric in assembly with bushing 88. Thus, angular position of module 82 about the axis of bushing 88 on base 80 is incrementally selectable by means of alignment of one of openings 106 with one of openings 104, and insertion of screw 102 into such aligned openings. Slot 98 in module 82 is of sufficient arcuate dimension to accommodate the full range of such arcuate incremental positioning of module 82 on base 80. In any assembled position of module 82 on cam base 80, a radially outwardly facing peripheral groove 108 on module 82 aligns circumferentially with groove 94 on guide 92, and thus forms a power cable take-up groove on power cam 46. The combination of power cable grooves 92 and 108 is of uniform radial spacing from axle bushing 88 up to a point 110 (FIGS. 5, 8 and 15), from which the radial dimension of power cable groove 108 radically decreases toward tangency with groove 89 in axle bushing 88. This point 110 is the power let-off point of module 82 and power cam 46, as will be described in greater detail in connection with FIG. 27. Power cable PC is anchored at 90 to base 80 of power cam 46, and extends through groove 94 of guide 92 at a position so as to wrap into and out of groove 108 in module 82 as bow 30 is drawn and released. Bow string cable BSC is trained in the opposite direction around groove 86 in cam base 80, and is affixed at its end to an anchor 111 (FIG. 7) fastened behind guide 92 so as to be coplanar with bow string take-up groove 86.

Control arm 84 (FIGS. 8–9, 13–14 and 32) in the preferred embodiment of the invention comprises a monolithic integral arcuate arm having a radially outwardly facing groove 112 that extends at uniform radius along the convex side edge thereof. Control arm 84 has an opening 114 at one end, which carries a bushing 116 (FIG. 9) that rotatably surrounds axle 48 in assembly. A second opening 118 extends through the opposing end of arm 84, through which a screw 120 extends into a threaded opening 122 in module 82 so as to fasten control arm 84 to module 82. Thus, the free end of control arm 84, which effectively forms the anchor for control cable CC at power cam 46, is disposed in fixed position on module 82 with respect to draw force break point or let-off point 110 on module 82, so that the spacing or distance 142 (FIG. 15) between the control cable anchor at the end of control arm 84 and let-off point 110 in power cable groove 108 remains fixed independent of adjusted position of module 82 on cam base 80. Control cable CC is trained, in the same direction as bow string cable BSC, around the end of arm 84 at axle 48, and thence along groove 112 to the opposing end of the control arm. Control cable CC in this embodiment then extends from this free end of arm 84 to an anchor pulley 124 on module 82. However, motion of control arm 84 in operation, as will be described, is such that the effective anchor of control cable CC is at the free end of the control arm.

Figure 13:
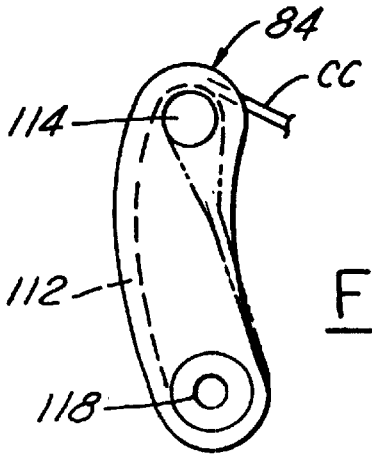
FIGS. 13 and 14 are side and end elevational views of the control arm in the power cam assembly illustrated in FIGS. 7–9.
Figure 14:
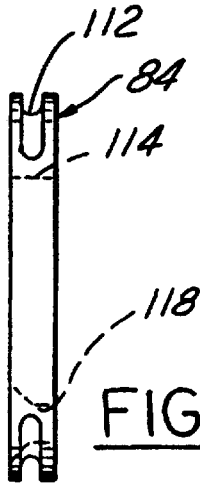
Figure 15:
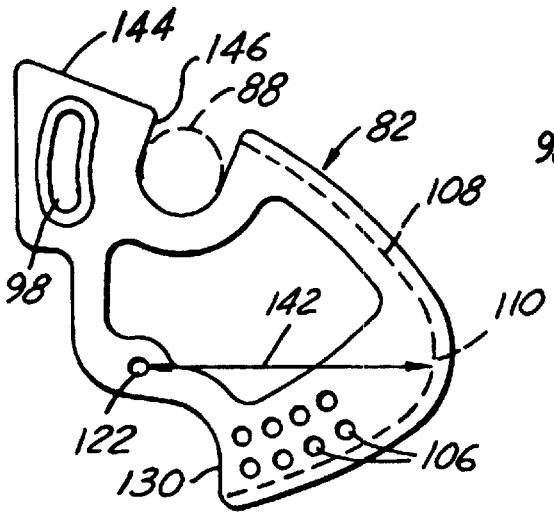
FIGS. 15, 16 and 17 are elevational views of alternative draw length modules in the power cam assembly illustrated in FIGS. 7–9.
Figure 32:
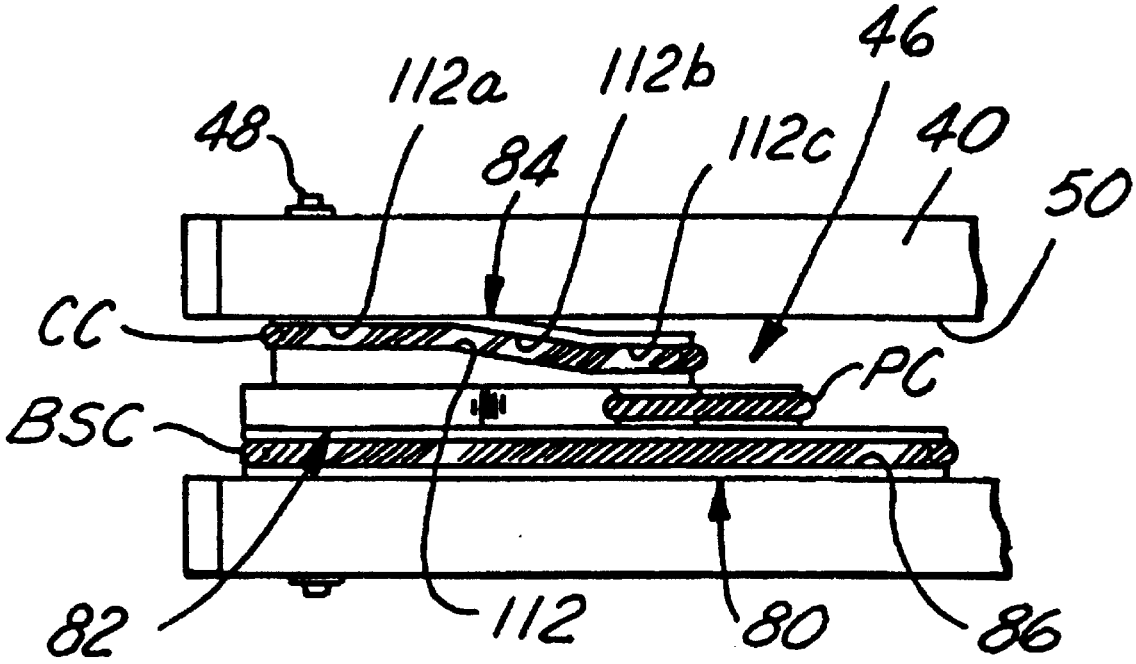
FIG. 32 is a fragmentary plan view taken substantially from the direction 32—32 in FIG. 8.

As best seen in FIGS. 14 and 32, groove 112 in control arm 84 has three distinct portions 112a, 112b and 112c, which together form the continuous groove 112. At the end of control arm 84 where groove 112 surrounds axle bearing opening 114, arm 84 is axially thickened, and groove portion 112a is positioned in assembly (FIG. 32) laterally outward from cam base 80 and module 82—i.e., adjacent to one fork of limb 40. The second portion 112b of groove 112 extends around the convex periphery of arm 84 and laterally inwardly toward module 82 and cam base 80, to join third portion laterally adjacent to module 82 surrounding arm mounting opening 118 (FIG. 13). Thus, groove end portions 112a, 112c extend around the free ends of control arm 84 at laterally uniform position, while control groove portion 112b extends at a lateral angle to join end portions 112a, 112b to each other.

Figure 18:
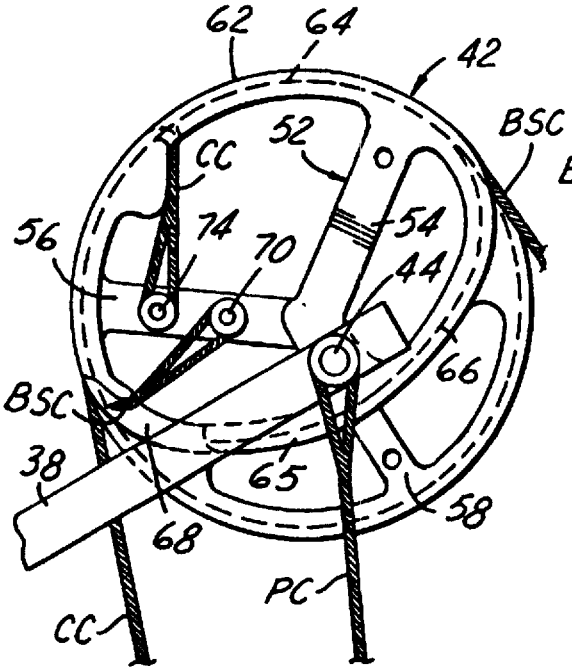
FIGS. 18 and 19 are fragmentary elevational views on opposite sides of the control wheel in the bow of FIG. 1 partially drawn.
Figure 19:
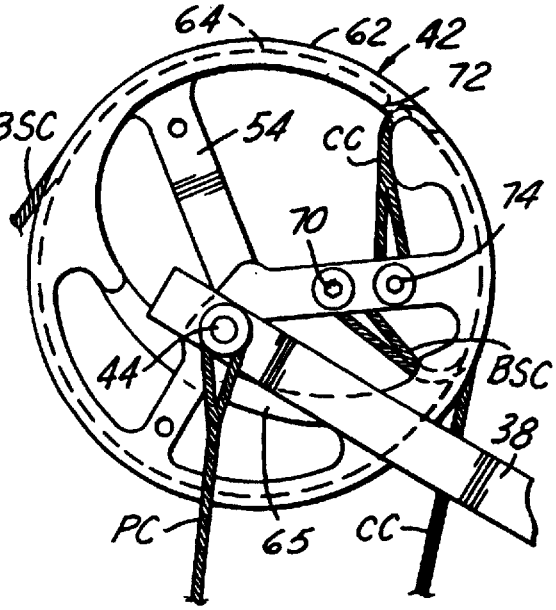
Figure 20:
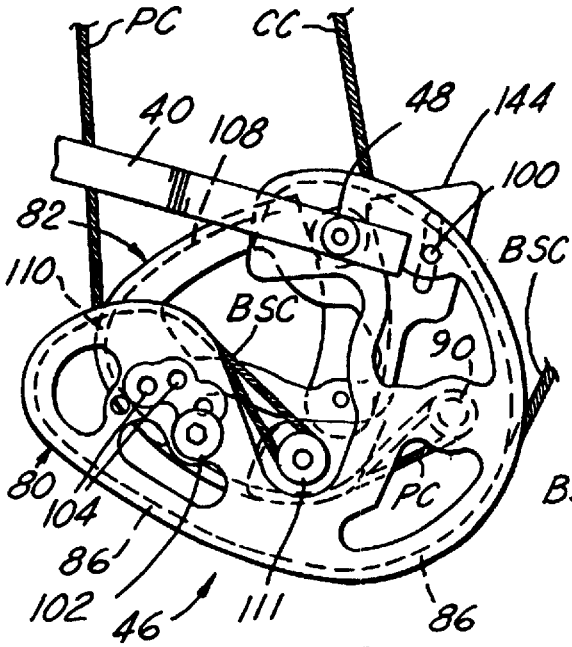
FIGS. 20 and 21 are fragmentary elevational views on opposite sides of the power cam in the bow of FIG. 1 partially drawn.
Figure 21:
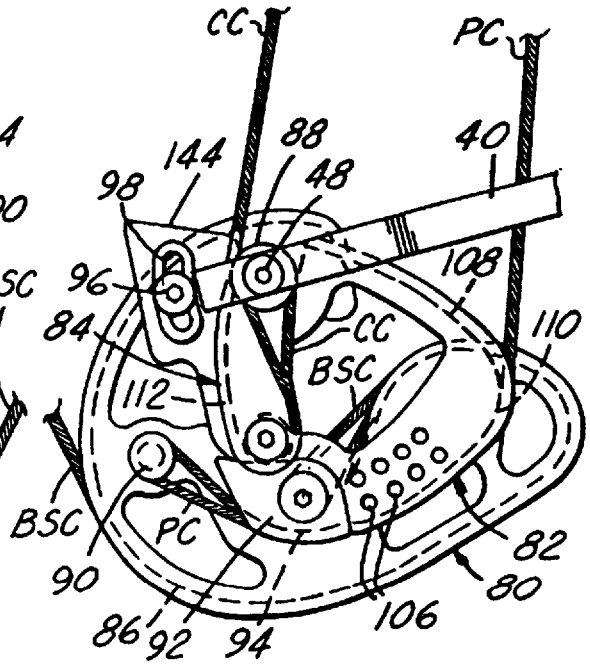

Operation of bow 30 is best illustrated by comparison of FIGS. 1–3, 7–8 and 32 that illustrate position of control wheel 42 and power cam 46 in the rest position of bow 30, with FIGS. 18–21 that illustrate the position of control wheel 42 and power cam 46 at an intermediate draw position, and FIGS. 22–25 that illustrate the positions of control wheel 42 and power cam 46 at the fully drawn condition. As bow string cable BSC and nock point 50 are initially drawn away from handle 32, control wheel 42 rotates from the position shown in FIGS. 1–3 to that shown in FIGS. 18–19, and power cam 46 rotates in the opposite direction from the position illustrated in FIGS. 1, 7–8 and 32 to that illustrated in FIGS. 20–21. At control wheel 42, bow string cable BSC is withdrawn or unwrapped from first bow string take-up groove 66, and control cable CC is simultaneously wrapped into control groove 64. Likewise, at power cam 46, bow string cable BSC is unwrapped from second bow string take-up groove 86, while control cable CC is unwrapped from groove portion 112a of control arm 84, and power cable PC is wrapped into groove 108 on module 82. During such initial bow draw, there is very little motion at control cable CC, and most of the unwrap of bow string cable BSC is accommodated by inward flexure of bow arms 38, 40, with power cable PC functioning to balance such flexure evenly between the bow arms. However, during such initial draw, tangency of control cable CC to groove portion 112a of control arm is at the laterally outer-most position with respect to the wraps of power cable PC and bowstring cable BSC so as to offset the tendency to apply a twisting torque to bow limb 40 through axle 48. This action continues until power cable PC is tangent to power let-off point 110 on module 82, as illustrated in FIGS. 20 and 21.

Figure 22:
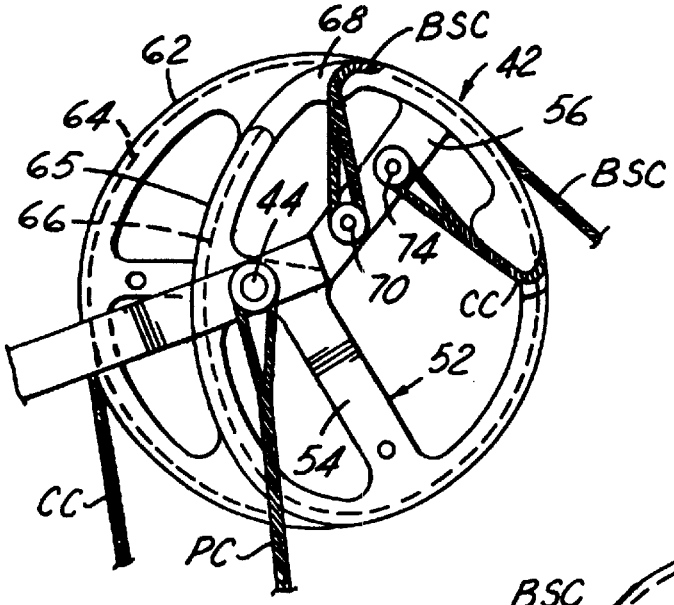
FIGS. 22 and 23 are fragmentary elevational views on opposite sides of the control wheel in the bow of FIG. 1 in the fully drawn position.
Figure 23:
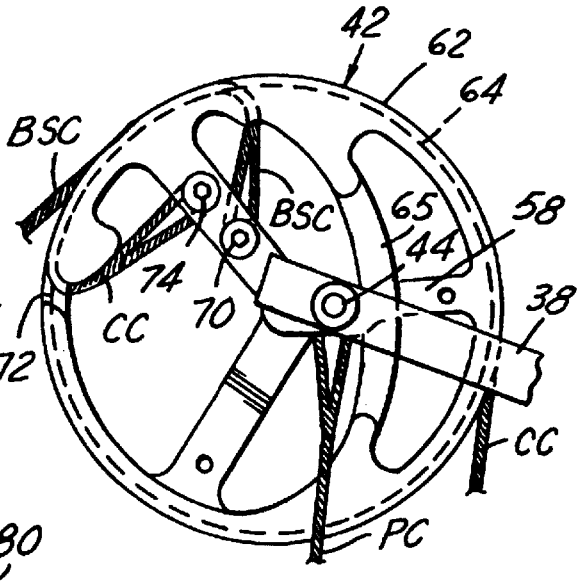
Figure 24:
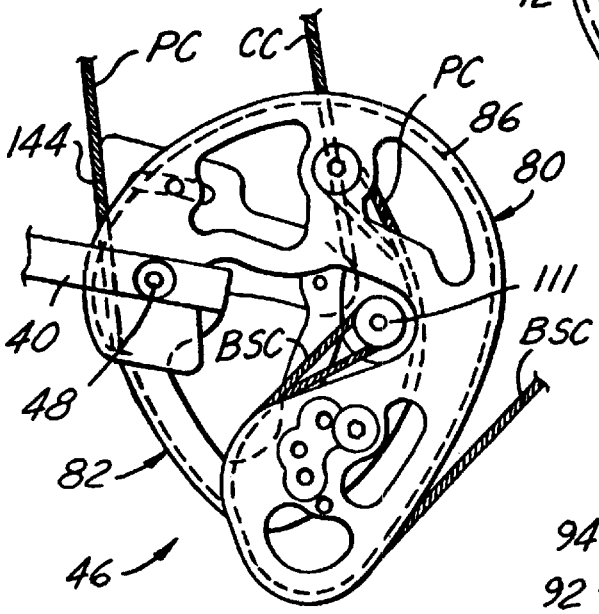
FIGS. 24 and 25 are fragmentary elevational views on opposite sides of the power cam in the bow of FIG. 1 in the fully drawn condition.
Figure 25:
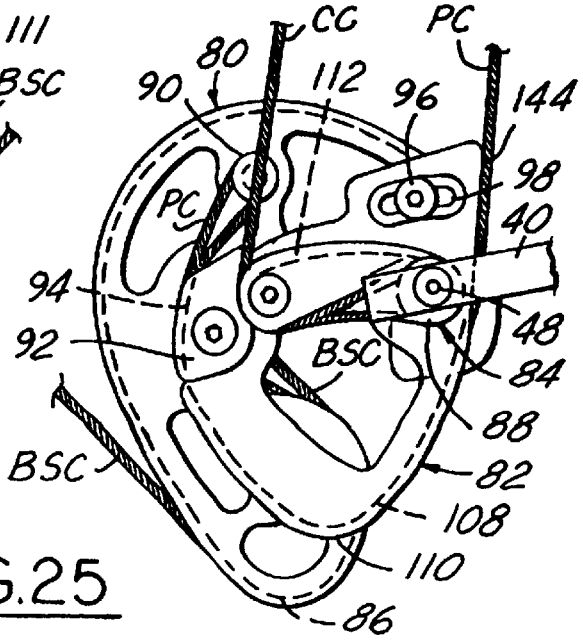

Further drawing of bow string cable BSC and nock point 50 away from bow handle 32 continues rotation of control wheel 42 from the position illustrated in FIGS. 18–19 to that illustrated in FIGS. 22–23, and rotation of power cam 46 from the position illustrated in FIGS. 20–21 to that illustrated in FIGS. 24–25. Bow string cable BSC continues to play out from first bow string take-up groove 66 on control wheel 42 and second bow string take-up groove 86 on power cam 46. Power cable PC now enters that portion of power cable groove 108 on module 82 at which the point of tangency of the power cable to groove 108 rapidly approaches bushing 88, and thus the axis of rotation of power cam 46 defined by axle 48. Since power cable PC flexes bow arms 38, 40 at a decreasing rate as leverage flexes during this portion of the draw cycle, it is necessary to let off or feed substantial length of control cable CC from power cam 48 to control wheel 42 in order to play out additional bow string cable BSC from take-up groove 66 on control wheel 42. This is accomplished by motion of control arm 84 (about the axis of axle 48) from the position illustrated in FIG. 21 at which the length of control arm 84 is approximately parallel to control cable CC, to the position of FIG. 25 at which the length of control arm 84 is approximately at a right angle to control cable CC. Such motion of control arm 84 between the position of FIG. 21 and that of FIG. 25 feeds additional control cable CC to control wheel 42 from groove portion 112b on control arm 84, plays out additional bow string cable BSC from control wheel 42, and thus maintains straight-line motion of bow string nock point 50 during this portion of bow string travel. Because of the shape of the bowstring take-up grooves and the power cam groove, bowstring cable BSC is fed out more rapidly as the power cam rotates toward the end of the draw cycle and the control arm advances the control wheel by means of control cable CC. At the same time as control cable CC is being fed off of control arm 84 as described immediately above, the point of tangency between control cable CC and groove portion 112b of control arm 84 moves laterally inwardly toward module 82 and cam base 80. At the fully drawn position (FIGS. 24 and 25), control cable CC is unwrapping from groove portion 112c, and tangency of the control cable to groove portion 112c is near the centerline of the limb.

When the bow string is released, the energy stored in flexed limbs 38, 40 moves the cables, power cam and control wheel from the positions of FIGS. 22–25 through those of FIGS. 18–21 to those of FIGS. 1–3 and 7–8. Control cable CC wraps into arcuate groove 112 on control arm 88 (FIGS. 24–25 to FIGS. 20–21) and control groove 64 on control wheel 42 (FIGS. 22–23 to FIGS. 18–19), power cable PC unwraps from bushing 88 and groove 108 toward let-off point 110 (FIGS. 24–25 to FIGS. 20–21), and bow string cable BSC begins to wrap into bow string take-up grooves 66, 86. Continued outward motion of limbs 38, 40 continues wrap of control cable CC around bushing 88 (FIGS. 20–21 to FIGS. 7–8) and into control groove 64 (FIGS. 18–19 to 203), unwrap of power cable PC from groove 108 (FIGS. 20–21 to FIGS. 7–8), and wrap of bow string cable BSC into bow string take-up grooves 66,88. During such motion of nock point 50 travels in a straight-line toward handle 32.

Figure 16:
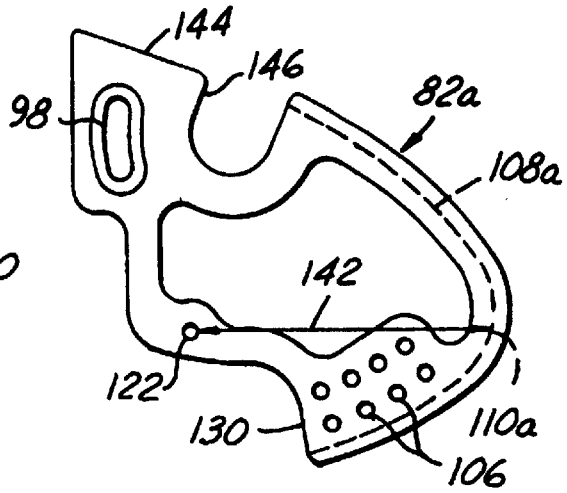
Figure 17:
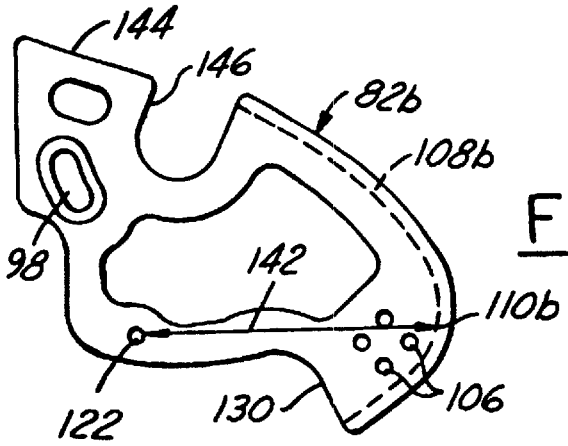
Figure 27:
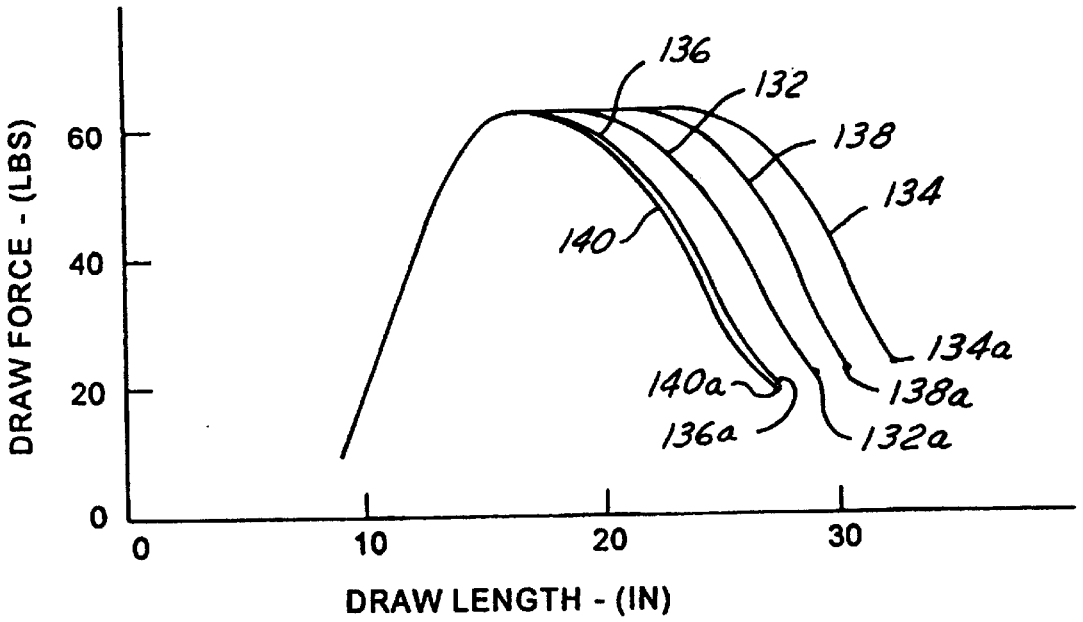
FIG. 27 is a graph illustrating force versus bow draw length in accordance with various embodiments of the invention.

FIGS. 16 and 17 illustrate modified draw-length modules 82a, 82b. Modules 82a, 82b have respectively lesser draw lengths than does module 82, determined by the arc of power cable groove 108, 108a, 108b between power let-off point 110 and stop 130, which angularly abuts guide 92 on cam base 80 at the minimum draw position of each draw-length module. Thus, draw-length is adjustable in the preferred embodiment of the invention both by replacement of the draw-length module with modules for differing draw-length, and by incremental angular adjustment of each module on the cam base. Thus, employing the three modules 82, 82a, 82b, for example, draw length characteristics are obtained as shown in FIG. 27. As the bow is initially drawn from the positions illustrated in FIGS. 1–3 and 7–8 to that illustrated in FIGS. 18–21, the force/draw curve in FIG. 27 initially increases and then flattens to a power let-off point (FIGS. 18–21), from which force rapidly decreases as additional bow string is drawn to the fully drawn position (FIGS. 22–25). As previously noted, draw-length module 82 has the greatest draw length of the three modules 82, 82a, 82b. Incrementally adjustable draw-length module 82 thus, in effect, defines a family of force/draw curves, all of which have similar increasing force/draw characteristics, and which have let-off characteristics from a characteristic 132 to a characteristic 134, for example. Similarly, module 82a can be angularly adjustably positioned on the cam base to define a second range of force/draw curves from curve 136 to curve 138, the higher end of this range thus overlapping the lower end of range 132 to 134. Similarly, module 82b can be angularly adjustably positioned on the cam base to define a range of curves 140 to 132, thus overlapping the force/draw characteristics of module 82a. The outer radius of power cable groove 108, 108a, 108b is the same in each module 82, 82a, 82b, thus accounting for the fact that the three modules have identical increasing and peak force/draw characteristics in FIG. 27. Furthermore, separation between control arm fastening opening 122 and power let-off point 110, 110a, 110b in each module—i.e., separation 142—is identical in each module, thus insuring that each module yields the same straight-line motion at the bow string nock point. It will be appreciated, of course, that additional modules 82 can be provided for differing ranges of draw length. Furthermore, the draw length characteristics can vary radically between the modules, although uniformity is preferred as described.

Another feature of the present invention is illustrated in FIGS. 8, 15–17, 21, 25 and 27. That is, a surface 144, preferably a flat planar surface, is formed on draw-length module 82 (and 82a, 82b) circumferentially aligned with and opposed to the end of power cable groove 108 (or 108a, 108b) across the opening 146 in each module that receives bushing 88. Surface 144 functions as a positive stop against further winding of power cable PC around power cam 46, and thus acts as a positive stop to bow string draw. This positive stop action is illustrated in FIGS. 24 and 25, in which power cable PC abuts surface 144, and thus affirmatively prevents further rotation of power cam 46. This affirmative draw stop is deemed particularly desirable by shooters, who can "rest" the bow at this fully drawn position while sighting the target. It will also be appreciated that, since surface 144 is formed on draw-length module 82 (and 82a, 82b, etc.), position of the draw stop relative to the power let-off point remains constant. The draw stops are thus illustrated at 132a, 134a, 136a, 138a and 140a in FIG. 27.

Figure 26:
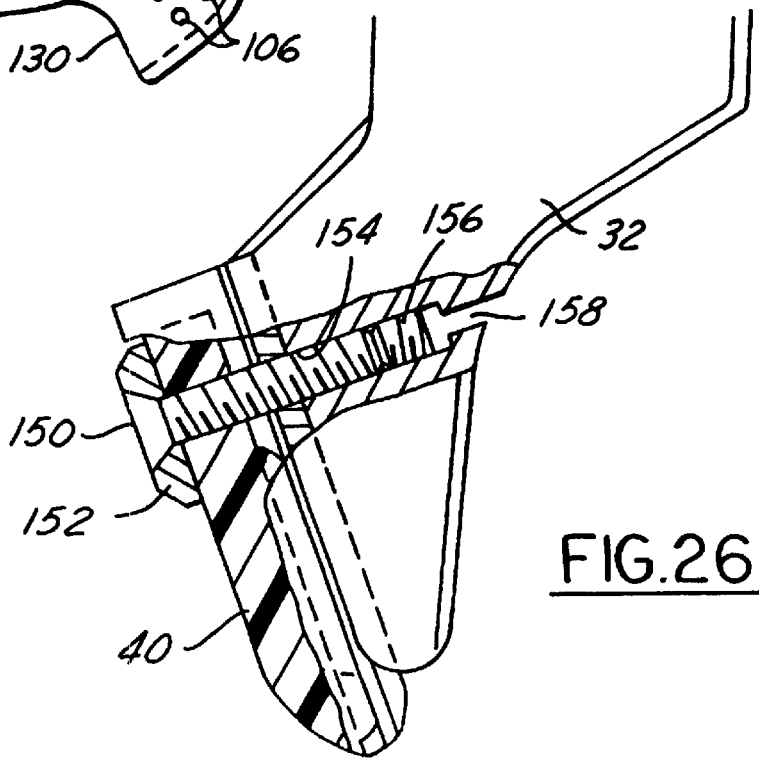
FIG. 26 is a fragmentary sectional view of the portion of FIG. 1 within the circle 26.

FIG. 26 illustrates another feature of the invention. Each bow limb 38, 40 is affixed to handle 32 by means of a screw 150, which extends through a washer 152, through limb 38 or 40, and into an internally threaded opening 154 in handle 32. Conventionally, screw 150 is set in place by means of a set screw that extends into the handle within a separately formed internally threaded opening at right angle to opening 154. In accordance with the feature of the invention illustrated in FIG. 26, the need for such a separately formed internally threaded opening is eliminated by providing a set screw 156 that is threaded into opening 154 prior to insertion of screw 150. That is, hole 154 is first formed by means of drilling or otherwise forming a through-opening 158 in handle 32, and then tapping this through-opening part way into the handle. Set screw 156 is then backed into opening 154 by means of a tool inserted through the remanent of opening 158, and screw 150 is then threaded into opening 154. When limb 40 is at the desired adjusted position, set screw 156 is tightened to axially opposed abutment against the end of screw 150 within opening 154, and screw 150 is thus firmly held in place. As an alternative to the embodiment illustrated in FIG. 26, hole 154 could be threaded completely through the handle, and set-screw 156 could be fed from the back side of the handle.

Figure 30:
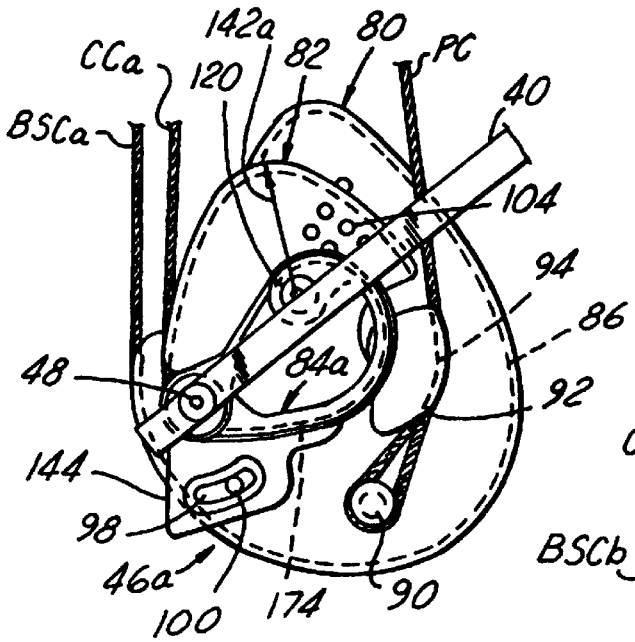
FIGS. 30 and 31 are fragmentary elevational views, similar to the view of FIG. 8, but showing respective embodiments of the power cam in the bow of FIG. 29.
Figure 31:
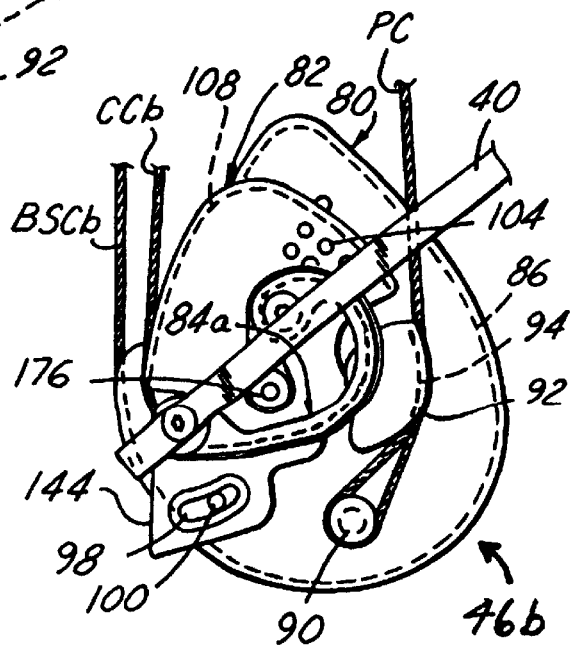
Figure 29:
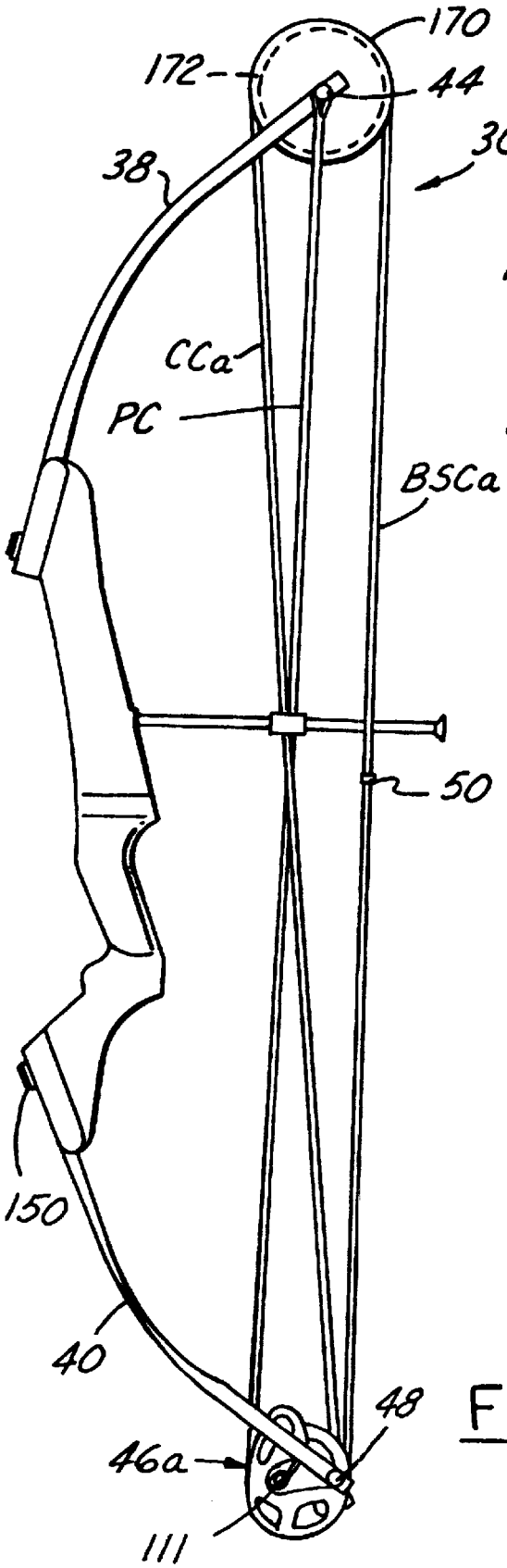
FIG. 29 is a side elevational view of a single-cam compound bow in accordance with a modified embodiment of the invention.

It will be appreciated, of course, that the shape of the power cam and control wheel are coordinated with each other and designed for desired performance. A modification to the preferred embodiment, illustrated in FIGS. 29–31, replaces the contoured control wheel in the preferred embodiment with a single-groove idler pulley, and places both bowstring take-up grooves on the power cam along with the power cable groove. In FIGS. 29–31, reference characters identical to those employed in FIGS. 1–28 indicate identical components, and reference characters with a suffix indicate functionally related but not identical components. Referring to FIGS. 29–30, there is illustrated a single-cam compound archery bow 30a having an idler pulley 170 rotatably mounted to limb 38 by axle 44. Idler pulley 170 has a single peripheral groove 172 that is concentric with axle 44. A power cam 46a is mounted to limb 40 by axle 48. Power cable segment PC extends from axle 44 to anchor 90 on power cam 46a, as in the previous embodiment. Bowstring cable BSC is anchored at 111 to power cam 46a to wrap into and unwrap from bowstring take-up groove 86. Bowstring cable BSC extends from anchor 111 and groove 86 across the bow to pulley 170 to form the bowstring cable segment on which nock 50 is positioned, and thence around idler pulley 170 in groove 172 back to power cam 46a. That is, bowstring cable BSC forms a continuous and uninterrupted length of cable stock that is trained around but not anchored to idler pulley 170.

At power cam 46a, control cable segment CCa of bow string cable BSC is trained around groove 89 of axle bushing 88 (FIG. 9), along a groove 174 in a control arm 84a, and thence to an anchor at axle 48. Take-up groove 174 is generally hook-draped, being rotatably mounted at one end to axle 48 by means of bushing 116 (FIG. 9), and being affixed to module 82 at an opposing end by screw 120. Thus, as in the previous embodiments, take-up groove 174 is affixed to module 82 so that the separation 142a between let-off point 110 on module 82 and the effective anchor of bow string segment BSC remains constant as module 82 is adjusted on cam base 80. As bowstring cable BSC is drawn, bowstring must be played out equally from power cam 46a and idler pulley 170. This is accomplished by rotation of power cam 46a, and play-out of cable from both grooves 86 and 174. That is, groove 174 on control arm 84a forms a second bowstring take-up groove, this time disposed on power cam 46a rather than on the opposing pulley—i.e., control wheel 42 in FIGS. 1–3. The radius of curvature of control arm 84a and groove 174 are such that the bowstring is played out more rapidly at the end of bow draw, as in the previous embodiments. FIG. 31 illustrates a modified cam 46b, in which the bowstring cable BSCb is anchored at 176 to module 82, rather than to axle 48 as in FIG. 30.

Figure 28:
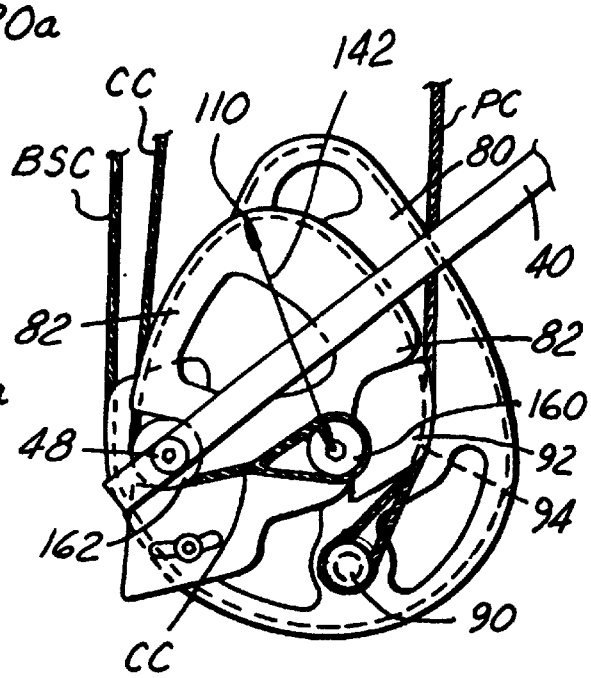
FIG. 28 is a fragmentary elevational view similar to that of FIG. 8 but showing a modified embodiment of the invention.

Although the invention has been described in conjunction with several presently preferred embodiment thereof, many other alternatives and variations may be implemented without departing from the spirit and broad scope of the invention. For example, the positions of control wheel 42 and power cam 46 (FIG. 1), or pulley 170 and power cam 46a (FIG. 29), may be reversed on bows 30, 30a. Similarly, the wheels, which are shown in right-hand configuration, may be provided in left-hand configuration as mirror images of the configurations shown. As noted above, draw length modules 82, etc. may be provided in many differing configurations other than those illustrated in FIGS. 15–17. FIG. 28 illustrates a modification in which control arm 84 has been replaced by a pulley 162 that encircles axle 48 and a control cable anchor 160 mounted on draw length module 82. Spacing 142 between anchor 160 and power let-off point 110 on draw length module 82 remains constant throughout adjustment of draw length module 82 and replacement of draw length module 82, as in the previous embodiment. The embodiment of FIG. 28 functions exactly the same as the embodiment of FIGS. 1–15 previously discussed. However, provision of a groove 112 on control arm 84 into which cable CC can wrap (FIG. 25 to FIG. 21) is quieter, and therefore preferred.

The invention has been described in connection with separate bow string, control and power cable segments in FIGS. 1–25 and 32, and separate power and bowstring/control cable segments in FIGS. 29–31. Such separate cable segments are preferred for economy of manufacture and service as previously noted. However, the invention could be implemented by combining bow string cable segment BSC and control cable segment CC (FIG. 1) into a single length of cable anchored at control wheel 42, and/or by combining power cable segment PC and bow string cable segment BSC, BSC (FIGS. 1 and 29 ) into a single length of cable anchored at power cam 46.

I claim:

1. A compound archery bow that comprises:

a bow handle having projecting limbs, first pulley means including means mounting said first pulley means for rotation about a first axis at an end of one of said limbs, second pulley means including means mounting said second pulley means for rotation about a second axis at an end of the other of said limbs, and bow cable means trained around and extending between said first and second pulley means and anchored to at least one of said limbs for drawing said bow, at least one of said pulley means including a draw length module mounted and adjustably positionable thereon for varying drawlength of said bow, said module having a groove into which said bow cable means wraps as said bow is drawn and draw stop means on said module aligned with said groove to prevent wrap of said bow cable means into said groove and thereby form a draw stop on said at least one pulley means, position of said draw stop on said at least one pulley means being adjusted conjointly with said module.

2. The bow set forth in claim 1 wherein said at least one pulley means comprises a base and a module assembled to said base including said groove and said draw stop means.

3. The bow set forth in claim 2 further comprising an axle bushing on said base for mounting said one pulley means to a bow limb, said groove terminating adjacent to said axle bushing, and said draw stop means comprising a planar wall on said module aligned with said groove across said axle bushing.

4. The bow set forth in claim 2 wherein said draw stop means is disposed tangent to said groove at minimum radius of said groove.

5. The bow set forth in claim 4 wherein said draw stop means comprises a flat planar surface on said module.

6. The bow set forth in claim 2 wherein said bow comprises a single-cam bow in which said first pulley means comprises a control wheel of fixed geometry and said second pulley means comprises a power cam having said module mounted thereon.

7. A single cam compound archery bow that comprises:

a bow handle having projecting limbs, first pulley means including means mounting said first pulley means for rotation about a first axis at an end of one of said limbs, second pulley means including means mounting said second pulley means for rotation about a second axis at an end of the other of said limbs, bow cable means including a first cable segment anchored at one end to said one limb at said first axis and at a second end to said second pulley means, a second cable segment anchored at one end to said second pulley means and extending to said first pulley means, and a third cable segment anchored at one end to said second pulley means and extending to said first pulley means, said third cable segment having a nock point that, when drawn away from said handle, unwraps said third cable segment equally from said first and second pulley means, wraps said second cable segment onto said first pulley means as said third cable segment is unwrapped therefrom, and wraps said first cable segment into a pulley groove on said second pulley means so as to drawn said limbs ends together up to a power let-off point at said pulley groove, and means for adjusting length of said pulley groove on said second pulley means, and thereby adjusting position of said power let-off point on said second pulley means, while maintaining a fixed spacing between said power let-off point and the anchor of said second cable segment to said second pulley means, such that said nock point travels in a straight line as said third cable segment is drawn away from said handle independent of length of said pulley groove between said power let-off point and the anchor of said first cable segment to said second pulley means, said second pulley means including said pulley groove in which said first cable segment wraps and unwraps on said second pulley means, and a bow string take-up groove in which said third cable segment wraps and unwraps on said second pulley means, said second pulley means comprising a base including said mounting means and said take-up groove, a module mounted on said base and including said pulley groove, an anchor for said second cable segment on said module, and means training said second cable segment from said anchor on said module around said axis of said second pulley means and thence toward said first pulley means, said training means comprising a control arm affixed to said module having one end forming said anchor and a second end at said second axis, said control arm having a groove in which said second cable segment wraps and unwraps as said second pulley means rotates.

8. The bow set forth in claim 7 wherein said second pulley means includes stop means aligned with said pulley groove to limit wrap of said first cable segment into said pulley groove, and thereby to limit draw of said bow.

9. A single cam compound archery bow that comprises:

a bow handle having projecting limbs, first pulley means including means mounting said first pulley means for rotation about a first axis at an end of one of said limbs, second pulley means including means mounting said second pulley means for rotation about a second axis at an end of the other of said limbs, bow cable means including a first cable segment anchored at one end to said one limb at said first axis and at a second end to said second pulley means, a second cable segment anchored at one end to said second pulley means and extending to said first pulley means, and a third cable segment anchored at one end to said second pulley means and extending to said first pulley means, said third cable segment having a nock point that, when drawn away from said handle, unwraps said third cable segment equally from said first and second pulley means, wraps said second cable segment onto said first pulley means as said third cable segment is unwrapped therefrom, and wraps said first cable segment into a pulley groove on said second pulley means so as to drawn said limbs ends together up to a power let-off point at said pulley groove, and means for adjusting length of said pulley groove on said second pulley means, and thereby adjusting position of said power let-off point on said second pulley means, while maintaining a fixed spacing between said power let-off point and the anchor of said second cable segment to said second pulley means, such that said nock point travels in a straight line as said third cable segment is drawn away from said handle independent of length of said pulley groove between said power let-off point and the anchor of said first cable segment to said second pulley means, said second pulley means including said pulley groove in which said first cable segment wraps and unwraps on said second pulley means, and a bow string take-up groove in which said third cable segment wraps and unwraps on said second pulley means, said second pulley means comprising a base including said mounting means and said take-up groove, a module mounted on said base and including said pulley groove, an anchor for said second cable segment on said module, and stop means aligned with said pulley groove to limit wrap of said first cable segment into said pulley groove and thereby limit draw of said bow.

10. The bow set forth in claims 7 or 9 wherein said adjusting means comprises means for selectively mounting different modules, having different pulley groove lengths, on said second pulley means.

11. The bow set forth in claim 10 wherein each of said modules includes means for adjustably positioning the module on said second pulley means so as to vary length of said pulley groove on said second pulley means.

12. The bow set forth in claim 10 wherein each said ,module includes means for anchoring said second cable segment to said second pulley means.

13. The bow set forth in claim 12 wherein said adjusting means comprises a plurality of said modules having different pulley groove lengths and different let-off points, said anchor means being disposed on each said module at identical spacing from the associated let-off point on the module.

14. The bow set forth in claims 7 or 9 wherein said adjusting means comprises a module and means for adjustably positioning said module on said second pulley means so as to vary length of said pulley groove on said second pulley means.

15. The bow set forth in claim 14 wherein said module includes means for anchoring said second cable segment to said second pulley means.

16. The bow set forth in claim 15 wherein said adjusting means comprises a plurality of said modules having different pulley groove lengths and different let-off points, said anchor means being disposed on each said module at identical spacing from the associated let-off point on the module.

17. The bow set forth in claims 7 or 9 wherein said module is removably mounted to said base.

18. The bow set forth in claims 7 or 9 wherein said module is adjustably positionable on said base.

19. The bow set forth in claim 9 wherein said second pulley means further comprises means training said second cable segment from said anchor on said module around said axis of said second pulley means and thence toward said first pulley means.

20. The bow set forth in claim 19 wherein said training means comprises a control arm affixed to said module having one end forming said anchor and a second end at said second axis, said control arm having a groove in which said second cable segment wraps and unwraps as said second pulley means rotates.

21. The bow set forth in claim [14] *20* or 7 wherein said groove on said control arm, into which said second cable segment wraps and unwraps, is spaced from said pulley groove, into which said first cable segment wraps and unwraps, by a greater distance at said first end of said control arm than at said second end of said control arm.

22. The bow set forth in claim 21 wherein said groove on said control arm has a first portion at said first end at constant spacing from said pulley groove, a second portion at said second end at constant spacing from said pulley groove, and a third portion extending between said first and second portions at a angle to said pulley groove.

23. The bow set forth in claims [14] *20* or 7 in which said second and third cable segments are integrally joined to each other as a continuous length of cable at said first pulley means, and in which said groove on said control arm comprises a second bowstring take-up groove in which said second cable [segments] *segment* wraps and unwraps on said second pulley means.

24. The bow set forth in claims [13] *19* or 7 wherein said training means comprises a pulley surrounding said axis and spaced from said anchor on said second pulley means, said second cable segment being trained from said anchor around said pulley toward said first pulley means.

25. The bow set forth in claims [1] *7* or 9 wherein said second pulley means further comprises a cable guide fixedly disposed on said base defining a portion of said pulley groove in cooperation with said module.

26. The bow set forth in claim 25 wherein said second pulley means further comprises an anchor for said first cable segment on said base adjacent to said cable guide.

27. The bow set forth in claims [21] *8* or 9 wherein said stop means is disposed on said module in fixed position relative to said let-off point.

28. The bow set forth in claim 27 wherein said stop means is disposed tangent to said pulley groove at minimum radius of said pulley groove with respect to said second axis.

29. The bow set forth in claim 28 wherein said stop means is disposed on said module.

30. The bow set forth in claim 29 wherein said stop means comprises a flat planar surface on said module.

31. The bow set forth in claims 7 or 9 wherein said first pulley means includes a first groove in which said second cable segment wraps and unwraps, and a second groove in which said third cable segment wraps and unwraps.

32. The bow set forth in claim 31 wherein said first pulley means comprises a one-piece integral construction in which both said first groove and said second groove are disposed.

33. The bow set forth in claim 32 wherein both said first groove and said second groove extend at least part-way around said first axis.

34. The bow set forth in claim 33 further comprising anchors on said first pulley means for said second and third cable segments.

35. The bow set forth in claim 34 wherein said one-piece integral construction includes a generally Y-shaped frame that carries said first and second grooves, said Y-shaped frame carrying said mounting means off-center from said grooves.

36. The bow set forth in claim 35 wherein said anchors for said second and third cable segment are mounted on said frame.

37. The bow set forth in claim 36 wherein said anchors are mounted on the same leg of said frame.

38. The bow set forth in claims 7 or 9 wherein said second and third cable segments are integrally joined to each other as a continuous length of cable at said first pulley means.

39. The bow set forth in claim 38 wherein said first pulley means has a peripheral groove extending entirely around said first pulley means around which said continuous cable is trained.

40. The bow set forth in claim 39 wherein said peripheral groove in said first pulley means is concentric with said first axis.

41. The bow set forth in claims 7 or 9 wherein said first cable segment comprises a cable segment, separate from said second and third cable segments, anchored at one end to said one limb and at another end of said second pulley means.

42. The bow set forth in claim 41 wherein said second and third cable segments are separate from each other, each anchored at one end to said first pulley means and at a second end to said second pulley means.

43. A single-cam compound bow that comprises:

a bow handle having projecting limbs, a control wheel rotatably mounted on an end of one of said limbs remote from said handle, said control wheel having a control groove and a first bow string take-up groove, a power cam rotatably mounted on an end of the other of said limbs remote from said handle, said power cam including a second bow string take-up groove and a power cable groove, bow cable means including a power cable segment anchored at one end to said one limb and at a second end to said power cam at a position to wrap into and unwrap from said power cable groove, a bow string cable segment anchored at said control wheel and said power cam at positions to wrap into and unwrap from said first and second bow string take-up grooves respectively, said bow string cable segment having a nock point disposed between said limb ends, and a control cable segment anchored at said control wheel at a position to wrap into and unwrap from said control groove and anchored at said power cam, such that draw of said bow string cable segment away from said handle unwraps said bow string cable segment form said control wheel and said power cam, wraps said power cable segment into said power cable groove so as to draw said limb ends together up to a power let-off point at said pulley groove, and wraps said control cable segment into said control groove on said control wheel, and means for adjusting length of said power cable groove on said power cam, and thereby adjusting position of said power let-off point on said power cam, while maintaining a fixed separation between said power let-off point and said control cable anchor on said power cam, such that said nock point travels in a straight line as said bow string cable segment is drawn independent of length of said power cable groove, said power cam further comprising means training said control cable segment from said anchor on said power cam around the axis of rotation of said power cam on said other limb and thence toward said control wheel, said training means comprising a control arm affixed to said power cam having one end forming said anchor of said control cable segment and a second end at said axis, said control arm having a groove in which said control cable segment wraps and unwraps as said power cam rotates.

44. A single-cam compound bow that comprises:

a bow handle having projecting limbs, a control wheel rotatably mounted on an end of one of said limbs remote from said handle, said control wheel having a control groove and a first bow string take-up groove, a power cam rotatably mounted on an end of the other of said limbs remote from said handle, said power cam including a second bow string take-up groove and a power cable groove, bow cable means including a power cable segment anchored at one end to said one limb and at a second end to said power cam at a position to wrap into and unwrap from said power cable groove, a bow string cable segment anchored at said control wheel and said power cam at positions to wrap into and unwrap from said first and second bow string take-up grooves respectively, said bow string cable segment having a nock point disposed between said limb ends, and a control cable segment anchored at said control wheel at a position to wrap into and unwrap from said control groove and anchored at said power cam, such that draw of said bow string cable segment away from said handle unwraps said bow string cable segment form said control wheel and said power cam, wraps said power cable segment into said power cable groove so as to draw said limb ends together up to a power let-off point at said pulley groove, and wraps said control cable segment into said control groove on said control wheel, and means for adjusting length of said power cable groove on said power cam, and thereby adjusting position of said power let-off point on said power cam, while maintaining a fixed separation between said power let-off point and said control cable anchor on said power cam, such that said nock point travels in a straight line as said bow string cable segment is drawn independent of length of said power cable groove, said power cam including stop means aligned with said power cable groove to limit wrap of said power cable segment into said power cable groove and thereby limit draw of said bow.

45. The bow set forth in claims 43 or 44 wherein said power cam comprises a cam base including said second bow string take-up groove, and a module mounted on said base and including said power cable groove.

46. The bow set forth in claim 45 wherein said adjusting means comprises means for adjustably positioning said module on said base for varying length of said power cable groove and position of said power let-off point.

47. The bow set forth in claim 44 wherein said stop means is disposed tangent to said power cable groove at minimum radius of said power cable groove with respect to said axis.

48. The bow set forth in claim 47 wherein said stop means comprises a flat planar surface on said power cam.

49. A single-cam compound bow that comprises:

a bow handle having projecting limbs, a control wheel rotatably mounted on an end of one of said limbs remote from said handle, said control wheel having a control groove and a first bow string take-up groove, a power cam rotatably mounted on an end of the other of said limbs remote from said handle, said power cam including a second bow string take-up groove and a power cable groove, bow cable means including a power cable segment anchored at one end to said one limb and at a second end to said power cam at a position to wrap into and unwrap from said power cable groove, a bow string cable segment anchored at said control wheel and said power cam at positions to wrap into and unwrap from said first and second bow string take-up grooves respectively, said bow string cable segment having a nock point disposed between said limb ends, and a control cable segment anchored at said control wheel at a position to wrap into and unwrap from said control groove and anchored at said power cam, such that draw of said bow string cable segment away from said handle unwraps said bow string cable segment form said control wheel and said power cam, wraps said power cable segment into said power cable groove so as to drawing said limb ends together up to a power let-off point at said pulley groove, and wraps said control cable segment into said control groove on said control wheel, and means for adjusting length of said power cable groove on said power cam, and thereby adjusting position of said power let-off point on said power cam, while maintaining a fixed separation between said power let-off point and said control cable anchor on said power cam, such that said nock point travels in a straight line as said bow string cable segment is drawn independent of length of said power cable groove, said power cam comprising a cam base including said second bow string take-up groove, means for anchoring said second end of said power cable, and first means forming a first portion of said power cable groove adjacent to said anchor, said length adjusting means comprising a module having a second portion of said power cable groove, said module being adjustably positionable on said base such that a gap between said first and second portions of said power cable groove formed by adjusting position of said module on said base is disposed between said anchor and said let-off point.

50. The bow set forth in [claims 45 or] *claim* 49 wherein said adjusting means comprises a plurality of said modules having different power groove lengths and different let-off points, and wherein each of said modules includes means for anchoring said control cable segment to said power cam at identical spacing from the associated let-off point of the module.

51. The bow set forth in claims 44 or 49 wherein said power cam further comprises means training said control cable segment from said control cable anchor on said power cam around the axis of rotation of said power cam on said other limb and thence toward said control wheel.

52. The bow set forth in claim 51 wherein said training means comprises a control arm having a first end affixed to said power cam at said anchor of said control cable segment and a second end at said axis, said control arm having a groove in which said control cable segment wraps and unwraps as said power cam rotates.

53. The bow set forth in claim 52 wherein said groove on said control arm is spaced from said power cable groove by a greater distance at-said first end than at said second end of said control arm.

54. The bow set forth in claim 53 wherein said groove on said control arm has a first portion at said first end at constant spacing from said power cable groove, a second portion at said second end at constant spacing from said power cable groove, and a third portion extending between said first and second portions at a angle to said power cable groove.

55. The bow set forth in claim 54 wherein said groove on said control arm is arcuate.

56. The bow set forth in claim 51 wherein said training means comprises a pulley surrounding said axis and spaced from said anchor of said control cable segment on said power cam, said control cable segment being trained from said anchor around said pulley toward said control wheel.

57. The bow set forth in claim 43 or 49 wherein said power cam includes stop means aligned with said power cable groove to limit wrap of said power cable segment into said power cable groove and thereby limit draw of said bow.

58. The bow set forth in claims 43, 44 or 49 wherein said power cable segment comprises a cable segment, separate from said control and bow string cable segments, anchored at one end to said one limb and at another end of said power cam.

59. The bow set forth in claim 58 wherein said control and bow string cable segments are separate from each other, each anchored; at one end to said control wheel and at a second end to said power cam.

*60. A single cam compound archery bow that comprises:*

*a bow handle having projecting limbs,*

*first pulley means including means mounting said first pulley means for rotation about a first axis at an end of one of said limbs,*

*second pulley means including means mounting said second pulley means for rotation about a second axis at an end of the other of said limbs, and*

*bow cable means including a first cable segment anchored at one end to said one limb at said first axis and at a second end to said second pulley means, a second cable segment anchored at one end to said second pulley means and extending to said first pulley means, and a third cable segment anchored at one end to said second pulley means and extending to said first pulley means,*

*said third cable segment having a nock point that, when drawn away from said handle, unwraps said third cable segment from said first and second pulley means, wraps said second cable segment onto said first pulley means as said third cable segment is unwrapped therefrom, and wraps said first cable segment into a pulley groove on said second pulley means so as to draw said limb ends together,*

*said second pulley means including said pulley groove in which said first cable segment wraps and unwraps on said second pulley means, a bow string take-up groove in which said third cable segment wraps and unwraps on said second pulley means, and an anchor at which said second cable segment is anchored to said second pulley means, said second cable segment being trained from said anchor around said second axis and thence to said first pulley means.*

*61. The bow set forth in claim 60 wherein said second cable segment is unsupported between said anchor and said second axis.*

*62. The bow set forth in claim 61 wherein said second pulley means includes a cam base and a module in said cam base for adjusting draw length of said bow, and wherein said anchor is mounted on said module.*

*63. The bow set forth in claim 61 wherein said third cable segment draws said limbs together up to a power let-off point at said pulley groove, and wherein said bow further comprises means for adjusting length of said pulley groove on said second pulley means, and thereby adjusting position of said power let-off point in said second pulley means, while maintaining a fixed spacing between said power let-off point and the anchor of said second cable segment to said second pulley means.*

*64. The bow set forth in claim 60 wherein said second pulley means comprises a base including said mounting means and said take-up groove, a module mounted on said base for adjusting draw length of said bow and including said pulley groove, an anchor for said second cable segment on said module, and means training said second cable segment from said anchor on said module around said axis of said second pulley means and thence toward said first pulley means, said training means comprising a control arm secured to said module having one end forming said anchor and a second end at said second axis, said control arm having a groove in which said second cable segment wraps and unwraps as said second pulley means rotates.*

*65. The bow as set forth in claim 64 wherein said control arm is removably secured to said module.*

*66. A single cam compound archery bow that comprises:*

*a bow handle having projecting limbs,*

*first pulley means including means mounting said first pulley means for rotation about a first axis at an end of one of said limbs,*

*second pulley means including means mounting said second pulley means for rotation about a second axis at an end of the other of said limbs, and*

*bow cable means including a first cable segment anchored at one end to said one limb at said first axis and at a second end to said second pulley means, a second cable segment anchored at one end to said second pulley means and extending to said first pulley means, and a third cable segment anchored at one end to said second pulley means and extending to said first pulley means,*

*said third cable segment having a nock point that, when drawn away from said handle, unwraps said third cable segment equally from said first and second pulley means, wraps said second cable segment onto said first pulley means as said third cable segment is unwrapped therefrom, and wraps said first cable segment into a pulley groove on said second pulley means so as to draw said limbs ends together,*

*said second pulley means including said pulley groove in which said first cable segment wraps and unwraps on said second pulley means, and a bow string take-up groove in which said third cable segment wraps and unwraps on said second pulley means,*

*said second pulley means comprising a base including said mounting means and said take-up groove, a module mounted on said base for adjusting draw length of said bow and including said pulley groove, an anchor for said second cable segment on said module, and means training said second cable segment from said anchor on said module around said axis of said second pulley means and thence toward said first pulley means, said training means comprising a control arm secured to said module having one end forming said anchor and a second end at said second axis, said control arm having a groove in which said second cable segment wraps and unwraps as said second pulley means rotates.*

*67. The bow as set forth in claim 66 wherein said control arm is removably secured to said module.*

*68. The bow as set forth in claim 66 wherein said module is removably mounted on said base for adjusting draw length of said bow.*

*69. The bow as set forth in claim 66 wherein said module is adjustably mounted on said base for adjusting draw length of said bow.*

*70. The bow set forth in claim 45 wherein said adjusting means comprises a plurality of said modules having different power groove lengths and different let-off points, and wherein each of said modules includes means for anchoring said control cable segment to said power cam at identical spacing from the associated let-off point of the module.*

* * * * *